United States Patent Office

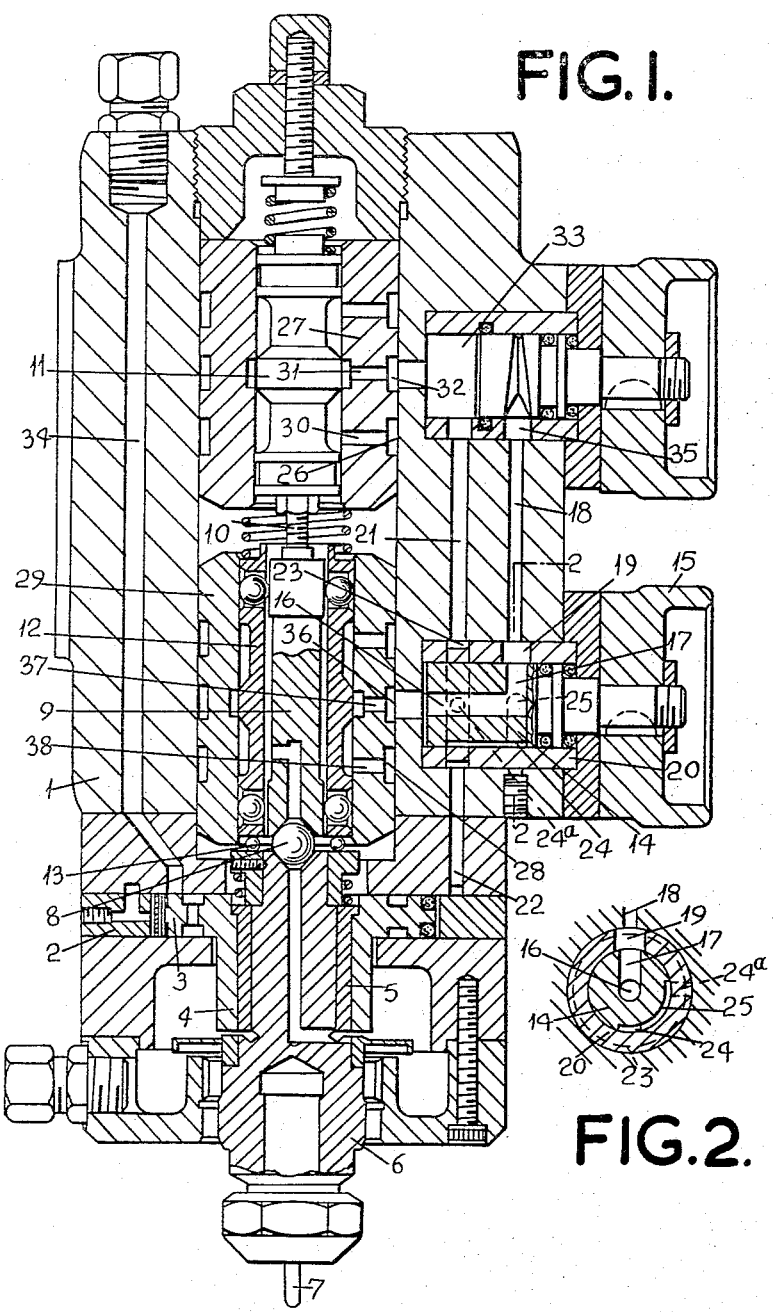

3,330,293
Patented July 11, 1967

3,330,293
PATTERN-CONTROLLED MACHINE TOOLS
Ronald Frank Holmes, Epsom, England, assignor to Precision Grinding Limited, Surrey, England
Filed Mar. 2, 1964, Ser. No. 348,685
3 Claims. (Cl. 137—270)

This invention relates to an hydraulically operated machine tool of the kind in which the relative movements of a tool and work-piece are controlled by contact of a tracer with a pattern to be reproduced, the machine tool, including a vertically movable and hydraulically operable slide which carries the tracer head and (in use) the tool.

One object of the present invention is to provide an improved form of tracer head which can be used in an hydraulically operated machine tool of the kind specified for the purpose of carrying out either of two operations commonly known respectively as profiling and die-sinking.

In accordance with the invention, there is provided in an hydraulically operated machine tool of the kind specified a tracer head comprising the combination of a tracer spindle having axial and lateral freedom of movement, a first valve member which is movable by the spindle and has only lateral freedom of movement, a second valve member having axial freedom of movement mounted co-axially with and movable by axial or lateral movements of the spindle, a third valve member having axial freedom of movement mounted co-axially with and movable by axial movements only of the spindle, and a control valve movable by an operator into either of two positions namely a first position in which the motive liquid for actuating the vertically movable and hydraulically operable slide is controlled by axial movement of the third valve member consequent upon vertical movement of the spindle (lateral movement of the spindle then having no effect on said slide) and a second position in which the motive liquid for actuating said slide is controlled by axial movement of the second valve member consequent upon either vertical or lateral movement of the spindle.

The invention will now be more particularly described with reference to the accompanying drawings wherein FIGURE 1 is a sectional elevation of one form of tracer head in accordance with the invention and FIGURE 2 is a fragmentary sectional view on the line 2—2 of FIGURE 1.

Refering to the drawings the tracer head there shown comprises a substantially cylindrical housing 1 having a central vertical bore. In the lower part of the housing and coaxial with the bore is formed a shallow cylindrical chamber 2 which contains a circular valve member 3 in the form of a circular plate having parts of its upper and lower faces in close contact with the corresponding faces of the said chamber. The valve member 3 is provided with a downwardly extending hollow boss 4 in which is mounted a bush 5 through which extends a spindle 6 carrying a tracer 7 at its lower end. At the upper end of said spindle 6 there is mounted a ball 8 which is located in part in a frusto-conical recess formed in the upper end of said spindle 6 and in part in a similar recess formed at the lower end of a member 9. The upper end of said member 9 engages through the intermediary of a screwed extension 10 the lower end of a second valve member 11, the aforementioned valve member 3 constituting a first valve member.

There is also provided a third valve member 12 which has a central bore through which the member 9 extends, the lower end of said third valve member 12 being spaced from the upper end of the spindle 6 by means of a bearing 13.

It will therefore be appreciated that lateral movement of the tracer and spindle will result in lateral movement of the first valve member 3, there being sufficient clearance between said valve member and the containing chamber for such lateral movement to occur. Furthermore lateral movement of the tracer 7 and spindle 6 will result through the action of the ball 8 in axial movement of the member 9 which in turn will effect axial movement of the second valve member 11.

Axial movement of the tracer 7 and spindle 6 will also result in axial movement of the second valve member 11 through the aforementioned connection provided by the ball 8 and member 9. Also axial movement of said tracer 7 and spindle 6 will result in axial movement of the third valve member 12 through the bearing 13. Said bearing will of course prevent any axial movement being imparted to the valve member 12 during lateral movement of the spindle 6.

There is also provided a control valve 14 which is angularly movable by an operator through the intermediary of a rotatable knob 15. Said control valve 14 is provided with a central bore 16 which communicates at one end with a radially extending pasage 17 which in turn communicates with a passage 18 through a port 19 formed in a sleeve 20 when said control valve is in the position shown in FIGURE 1. Another passage 21 communicates with a passage 22 through an annular groove 23 formed on said sleeve 20. The control valve 14 is also provided on its periphery with an axially extending groove 24 which communicates at one end with a short groove 25 extending part-way around the circumference of said valve member 14.

In use pressurized liquid would be supplied by a pump (not shown) to the annulus 26 in sleeve 27 asociated with the second valve member 11 and also to the annulus 28 formed in a sleeve 29 associated with the third valve member 12. With the control valve 14 in the position shown in FIGURE 1 assume now that a lateral movement is imparted to the tracer 7. Such lateral movement will result in axial movement of the valve member 11 by the action of the ball 8 and its coacting recesses as previously explained while the third valve member 12 remains stationary. Pressurized liquid will thus pass from the annulus 26 into a passage 30 and thence to a passage 31, annulus 32 and through chamber 33 to the passage 21. From this passage 21 the pressurized liquid flows around the annulus 23 to passage 22 and thence into the chamber 2 where it is controlled by the valve member 3 so that liquid is passed via grooves formed in the faces of said valve member 3 into one or more of four passages 34 (one only being seen in FIGURE 1) and from such passage or passages to rams (not shown) for effecting lateral movement of the tool to follow the lateral movement of the tracer 7.

The aforementioned passage 18 is connected via a port 35 to a vertically movable and hydraulically operable slide (not shown) but in the position shown in FIGURE 1 no motive liquid for actuating said slide can enter the passage 18 while the tracer 7 undergoes lateral movement. If however said tracer is moved vertically the valve member 12 will also be moved axially so that pressurized liquid entering at annulus 28 will flow into annulus 36 via the passages 37 and 38 so that liquid can enter the bore 16 in the valve member 14 and thence flow through the radial passage 17 and into the passage 18, thereby actuating the vertically movable slide. At the same time the second valve member 11 is also lifted so that pressurized liquid will be available in the chamber 2 for use if lateral movement of the tracer occurs. With the control valve 14 in the position shown in FIGURE 1 the machine tool is in a condition to carry out an operation generally known as profiling.

By turning the knob 15 through 90° in an anti-clockwise direction as seen in FIGURE 2 the control valve 14 can however be turned into a position in which the radial passage 17 is no longer in alignment with the port 19. In this position of the control valve however the groove 25 is disposed in a position in which it can conduct liquid from the groove 24 to the port 19, said groove 24 then being supplied with pressurized liquid through one or more drillings 24a communicating with the annulus 23. Thus if the tracer 7 now undergoes lateral movement the second valve member 11 will be lifted and pressurized liquid will be supplied to the passage 21. Liquid will flow from this passage to the passage 22 via the annulus 23 so as to be available for use in the chamber 2 as before but at the same time liquid will also be conducted via annulus 23, drilling 24a, grooves 24 and 25 to the port 19 and passage 18 and thence to the vertically movable slide. Lateral movement of the tracer 7 will thus result in actuation of the vertically movable slide. Similarly axial movement of the tracer 7 will also result in lifting of the valve member 11 which again effects the actuation of the vertically movable slide. The third valve member 12 will however now be ineffective since any pressurized liquid flowing from the annulus 28 to the annulus 36 will no longer be able to flow out of the radial passage 17. Thus in this last described position of the control valve 14 the machine tool will be in a condition to carry out an operation commonly known as die-sinking.

It will therefore be understood that the provision of the control valve 14 together with the other parts above described will enable the machine tool to be converted from use as a profiler to use as a die-sinker and vice versa in a very simple manner.

Having thus described my invention what I claim as new and desire to secure by Letters Patent is:

1. In an hydraulically operated machine tool of the kind specified, a tracer head comprising the combination of a tracer spindle having only axial and lateral freedom of movement, a first valve member adapted to control the motive fluid for actuating a laterally movable slide and which is movable only by lateral movements of the spindle and has only lateral freedom of movement, a second valve member having only axial freedom of movement mounted co-axially with and movable both by axial and lateral movements of the spindle, a third valve member having only axial freedom of movement mounted co-axially with and movable by axial movements only of the spindle, and a control valve movable by an operator into either of two positions namely a first position in which the motive liquid for actuating a vertically movable and hydraulically operable slide is controlled only by axial movement of the third valve member consequent upon axial movement of the spindle and a second position in which the motive liquid for actuating the vertically movable and hydraulically operable slide is controlled only by axial movement of the second valve member consequent upon either axial or lateral movement of the spindle.

2. In an hydraulically operated machine tool of the kind specified, a tracer head comprising the combination of a tracer spindle having only axial and lateral freedom of movement, a first valve member adapted to control the motive fluid for actuating a laterally movable slide and which is movable only by lateral movements of the spindle and has only lateral freedom of movement, a second valve member having only axial freedom of movement mounted co-axially with and movable both by axial and lateral movements of the spindle, a third valve member disposed between the tracer spindle and the second valve member and having only axial freedom of movement, said third valve member being mounted co-axially with and movable by axial movements only of the spindle, an actuating member for said second valve member which actuating member extends through a bore provided in the third valve member, and a control valve movable by an operator into either of two positions namely a first position in which the motive liquid for actuating a vertically movable and hydraulically operable slide is controlled only by axial movement of the third valve member consequent upon axial movement of the spindle and a second position in which the motive liquid for actuating the vertically movable and hydraulically operable slide is controlled only by axial movement of the second valve member consequent upon either axial or lateral movement of the spindle.

3. In an hydraulically operated machine tool of the kind specified, a tracer head comprising the combination of a tracer spindle having only axial and lateral freedom of movement, a first valve member adapted to control the motive fluid for actuating a laterally movable slide and which is movable only by lateral movements of the spindle and has only lateral freedom of movement, a second valve member having only axial freedom of movement mounted co-axially with said spindle, an actuating member for said second valve member, said actuating member having at one end remote from the second valve member a frusto-conical recess, said spindle having at one end adjacent to said actuating member a further frusto-conical recess, a ball located in part in said first-mentioned recess and in part in said further recess whereby both axial and lateral movements of the spindle result in axial movements of said actuating member and, through the latter, of said second valve member, a third valve member disposed between the tracer spindle and the second valve member and having only axial freedom of movement, said third valve member being mounted co-axially with said spindle, a bearing disposed between adjacent ends of the third valve member and the spindle whereby the third valve member is movable by axial movements only of the spindle, said third valve member having a bore through which said actuating member extends, and a control valve movable by an operator into either of two positions namely a first position in which the motive liquid for actuating a vertically movable and hydraulically operable slide is controlled only by axial movement of the third valve member consequent upon axial movement of the spindle and a second position in which the motive liquid for actuating the vertically movable and hydraulically operable slide is controlled only by axial movement of the second valve member consequent upon either axial or lateral movement of the spindle.

References Cited

UNITED STATES PATENTS

| | | | |
|---|---|---|---|
| 2,331,817 | 10/1943 | Turchan et al. | 251—3 |
| 2,911,182 | 11/1959 | Clarke et al. | 251—3 |
| 3,139,002 | 6/1964 | Evans | 251—3 X |
| 3,186,425 | 6/1965 | Weaver | 251—3 X |

WILLIAM F. O'DEA, *Primary Examiner.*

R. GERARD, *Assistant Examiner.*